US009881486B2

(12) United States Patent
Bharti et al.

(10) Patent No.: US 9,881,486 B2
(45) Date of Patent: Jan. 30, 2018

(54) WEARABLE DEVICE FOR AUTOMATIC DETECTION OF EMERGENCY SITUATIONS

(71) Applicant: International Business Machines Corporation, Armonk, NY (US)

(72) Inventors: Harish Bharti, Pune (IN); Sanjib Choudhury, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/751,670

(22) Filed: Jun. 26, 2015

(65) Prior Publication Data

US 2016/0379473 A1 Dec. 29, 2016

(51) Int. Cl.

| | |
|---|---|
| ***G08B 25/01*** | (2006.01) |
| ***H04B 1/3827*** | (2015.01) |
| ***H04W 4/22*** | (2009.01) |
| ***G08B 21/18*** | (2006.01) |
| ***G08B 25/08*** | (2006.01) |

(52) U.S. Cl.

CPC ......... *G08B 25/016* (2013.01); *G08B 21/182* (2013.01); *G08B 25/08* (2013.01); *H04B 1/385* (2013.01); *H04W 4/22* (2013.01)

(58) Field of Classification Search

CPC .. G08B 25/016; G08B 21/02; G08B 21/0438; G08B 21/0453; G08B 21/0446; H04B 1/385; H04L 67/12; H04R 29/008; A61B 5/022; A61B 5/02444; A61B 5/048

See application file for complete search history.

(56) References Cited

U.S. PATENT DOCUMENTS

| | | | |
|---|---|---|---|
| 7,091,852 | B2 | 8/2006 | Mason et al. |
| 7,297,110 | B2 | 11/2007 | Goyal et al. |

(Continued)

FOREIGN PATENT DOCUMENTS

| | | | |
|---|---|---|---|
| CA | 2831534 | A1 | 4/2014 |
| KR | 101422234 | B1 | 7/2014 |

(Continued)

OTHER PUBLICATIONS

Almagrabi et al., "A System for Context-Aware Emergency Messaging", Journal of Personal and Ubiquitous Computing (PUC), 2013, pp. 1-37, <https://cammbodocument.wordpress.com/2013/06/07/ontology-based-context-aware-messaging-systems-concept-methodology-and-applications-documentation/>.

(Continued)

*Primary Examiner* — An T Nguyen

(74) *Attorney, Agent, or Firm* — Stephanie L. Carusillo; Edward J. Wixted, III

(57) ABSTRACT

A portion of data is received from each sensor of a plurality of sensors. An emergency level corresponding to each metric of a plurality of metrics is calculated, where the calculated emergency level is determined based on the portion of data received from the sensors. A total emergency level corresponding to the current situation is calculated, where the calculation of the total emergency level is based on the emergency level calculated for each metric. It is determined whether the total emergency level is above a critical threshold, where the critical threshold is selected by the user. If it is determined that the total emergency level is above the critical threshold, an alert is sent to a party such as one or more local authorities.

19 Claims, 6 Drawing Sheets

(56) References Cited

U.S. PATENT DOCUMENTS

| | | | | |
|---|---|---|---|---|
| 8,023,895 | B2 | 9/2011 | Smith | |
| 8,301,463 | B2 | 10/2012 | Lui et al. | |
| 2004/0024706 | A1 | 2/2004 | Leduc | |
| 2006/0267756 | A1* | 11/2006 | Kates | G01N 33/0065 340/521 |
| 2007/0150024 | A1* | 6/2007 | Leyde | A61B 5/0476 607/45 |
| 2007/0150025 | A1* | 6/2007 | Dilorenzo | A61B 5/0476 607/45 |
| 2007/0287931 | A1* | 12/2007 | Dilorenzo | A61B 5/0476 600/545 |
| 2008/0266118 | A1 | 10/2008 | Pierson et al. | |
| 2010/0100004 | A1* | 4/2010 | van Someren | A61B 5/0008 600/549 |
| 2011/0043496 | A1 | 2/2011 | Ray Avalani | |
| 2011/0112442 | A1* | 5/2011 | Meger | A61B 5/0002 600/595 |
| 2013/0011819 | A1* | 1/2013 | Horseman | A61B 5/6887 434/257 |
| 2013/0339019 | A1* | 12/2013 | Giancarlo | G10L 15/04 704/251 |
| 2014/0073486 | A1 | 3/2014 | Ahmed et al. | |
| 2014/0135644 | A1 | 5/2014 | Kim | |
| 2014/0221780 | A1 | 8/2014 | Goldberger et al. | |
| 2015/0110277 | A1* | 4/2015 | Pidgeon | H04R 3/00 381/56 |
| 2015/0269824 | A1* | 9/2015 | Zhang | G08B 21/0438 340/539.12 |
| 2015/0269835 | A1* | 9/2015 | Benoit | G08B 25/10 340/539.13 |
| 2016/0029890 | A1* | 2/2016 | Stump | A61B 5/0022 600/301 |
| 2016/0063850 | A1* | 3/2016 | Yang | G08B 23/00 340/539.22 |
| 2016/0071399 | A1* | 3/2016 | Altman | G10L 15/02 340/539.11 |
| 2016/0302677 | A1* | 10/2016 | He | A61B 5/02125 |
| 2016/0328940 | A1* | 11/2016 | Yi | H04N 7/188 |

FOREIGN PATENT DOCUMENTS

| | | | |
|---|---|---|---|
| TW | 477869 | U | 5/2014 |
| WO | 2013095151 | A1 | 6/2013 |

OTHER PUBLICATIONS

Cardin, et al., "Wearable Obstacle Detection System for visually impaired People", pp. 1-6.

Chandwani, Karuna, "Top 8 Apps for Safety of Women in India: Damini, iFollow, Scream Alarm, Fightback and More", Jun. 29, 2013, printed Feb. 18, 2015, pp. 1-4, <http://www.ibtimes.co.in/articles/484627/20130629/apps-women-safety-sentinel-ifollow-android-app.htm>.

Devine, Richard, "AT&T announces Filip, a connected wearable for your kids", Oct. 7, 2013, printed Feb. 18, 2015, pp. 1-7, <http://www.imore.com/att-announces-filip-connected-wearable-your-kids>.

Dionisi, et al., "Wearable Object Detection System for the Blind", © 2012, IEEE, 978-1-4577-1772-7/12, pp. 1-4.

Earshia, et al, "A Wearable Ultrasonic Obstacle Sensor for Aiding Visually Impaired and Blind Individuals", International Journal of Computer Applications (IJCA), National Conference on Growth of Technologies in Electronics, Telecom and Computers—India's Perception, GOTETC-IP'13, pp. 24-26.

Ertin, et al.,"AutoSense: Unobtrusively Wearable Sensor Suite for Inferring the Onset, Causality, and Consequences of Stress in the Field", © 2011, ACM 978-1-4503-0718-5/11/11, pp. 274-287.

Kuroda et al., "Method for determining pilot stress through analysis of voice communication", Aviat Space Environ Med., May 1976, vol. 47, issue 5, pp. 528-533, <http://www.ncbi.nlm.nih.gov/pubmed/1275844>.

Lowen, Linda, "Best Apps for Women Concerned with Safety", printed Feb. 18, 2015, pp. 1-8, <http://womensissues.about.com/od/violenceagainstwomen/tp/Best-Apps-For-Women-Concerned-With-Safety-And-Security.htm>.

Prabhudesai, Arun, "5 Free Mobile Apps for Safety of Indian Women [Happy Women's Day]", Mar. 8, 2014, printed Feb. 18, 2015, pp. 1-5, <http://trak.in/tags/business/2014/03/08/5-free-mobile-apps-women-safety/>.

Shoemake, Lindsay, "Working Girl Gadgets: React Mobile", Sep. 7, 2013, printed Feb. 18, 2015, pp. 1-3, <http://thatworkinggirl.com/2013/09/07/working-girl-gadgets-react-mobile/>.

Taleb, et al., "Angelah: a framework for assisting elders at home", Selected Areas in Communications, IEEE Journal, vol. 27, Issue: 4, May 2009, pp. 480-494, <http://ieeexplore.ieee.org/xpls/abs_all.jsp?arnumber=4909285&tag=1>.

"bSafe—Personal Safety App", Android Apps on Google Play, Bipper, Inc., Jan. 18, 2015, printed Feb. 18, 2015, pp. 1-4, <https://play.google.com/store/apps/details?id=com.bipper.app.bsafe>.

"Find My Kids ~ Footprints", iTunes Preview, Sollico Software, Sep. 15, 2013, printed Feb. 18, 2015, pp. 1-4, <https://itunes.apple.com/us/app/find-my-kids-footprints/id400119299?mt=8>.

"FiLIP", 4-traders, printed Feb. 18, 2015, pp. 1-2, <http://www.4-traders.com/out.php?url=http%3A%2F%2Fwww.myfilip.com%2F>.

"For Your Child", Revolutionary Tracker, printed Feb. 18, 2015, pp. 1-2, <http://www.revolutionarytracker.com/Solutions-for-People/children/>.

"Intel Edison—One Tiny Platform, Endless Possibility", Intel, printed Feb. 20, 2015, pp. 1-5, <http://www.intel.com/content/www/us/en/do-it-yourself/edison.html>.

"Miniature GPS module+Bluetooth Conectivity"; Geochild, printed Feb. 18, 2015, pp. 1-3, <http://www.geochild.com/epages/ec4290.sf/en_GB/?ObjectPath=/Shops/ec4290/Categories/Especificaciones>.

"OnWatch—The Personal Safety App for College Students", iTunes Preview, Safety Alert Apps, Inc., Dec. 12, 2014, printed Feb. 18, 2015, pp. 1-3, <https://itunes.apple.com/us/app/onwatch-personal-safety-app/id473517240?mt=8>.

"Preorder—66 Euros Taxes Included", Geochild, printed Feb. 18, 2015, p. 1, <http://www.geochild.com/epages/ec4290.sf/en_GB/?ViewObjectID=15356814>.

"SOS—Stay Safe!", iXtentia, © 2014, printed Feb. 18, 2015, pp. 1-7, <http://www.ixtentia.com/portfolio/SOS-Stay-Safe-personal-safety-app.html>.

"Top 5 Best Safety Android and IOS Apps for Women", All Tech Tweaks, printed Feb. 18, 2015, pp. 1-3, <http://www.alltechtweaks.com/2014/03/best-security-apps-women.html>.

"VithU: V Gumrah Initiative", Android Apps on Google Play, STAR India Pvt. Ltd., Nov. 26, 2013, printed Feb. 18, 2015, <https://play.google.com/store/apps/details?id=com.startv.gumrah>.

"Voice Level and Distance", The Engineering Toolbox, printed Feb. 18, 2015, pp. 1-3, <http://www.engineeringtoolbox.com/voice-level-d_938.html>.

"Watch Over Me—The Personal Safety App", iTunes Preview, SECQME SDN BHD, Dec. 31, 2014, printed Feb. 18, 2015, pp. 1-3, <https://itunes.apple.com/us/app/watch-over-me-personal-safety/id431208868?mt=8>.

"Women's Safety App" Android Apps on Google Play, Mar. 1, 2014, printed Feb. 18, 2015, pp. 1-4, <https://play.google.com/store/apps/details?id=com.lakshmi.shakenalert>.

"Women's Security", Android Apps on Google Play, AppsofIndia, Dec. 17, 2013, printed Feb. 18, 2015, pp. 1-5, <https://play.google.com/store/apps/details?id=com.zayaninfotech.security>.

* cited by examiner

| | 460 NAME | 470 EMERGENCY LEVEL | 480 WEIGHT | 490 TOTAL |
|---|---|---|---|---|
| 410 | HEARTRATE | 1 | 5 | 5 |
| 420 | BODY TEMP | 1 | 3 | 3 |
| 430 | PROXIMITY | 0 | 1 | 0 |
| 440 | PANIC VOICE | 0 | 5 | 0 |
| 450 | VOICE ID | 1 | 3 | 3 |
| | | | TOTAL | 11 (495) |

| | |
|---|---|
| FIRST NAME | JOHN |
| LAST NAME | SMITH |
| AGE | 6 |
| GENDER | MALE |
| HEIGHT | 4' 3" |
| WEIGHT | 95 LBS |
| EYE COLOR | BROWN |
| HAIR COLOR | BROWN |
| AVG HR | 110 BPM |

FIG. 5

WEARABLE DEVICE FOR AUTOMATIC DETECTION OF EMERGENCY SITUATIONS

BACKGROUND OF THE INVENTION

The present invention relates generally to the field of wearable devices and more particularly to the use of wearable devices for safety and security purposes.

Wearable devices are used to track actions of users and to provide users with convenient access to information. Wearable devices are often used to track physiological data such as the body temperature or heart rate of the user, as well as information such as the current location of the user. Wearable devices are often configured to passively collect information as the user goes about their day without any direct interaction between the wearable device and the user.

Each year there are thousands of child abduction cases reported worldwide. In many of these cases children are unable to protect themselves and cannot be easily located after an abduction occurs.

SUMMARY

Embodiments of the invention disclose a method for identifying an emergency situation and sending an emergency alert and a wearable computing device for performing the method. A portion of data is received from each sensor of a plurality of sensors. An emergency level corresponding to each metric of a plurality of metrics is calculated, where the calculated emergency level is determined based on the portion of data received from the sensors. A total emergency level corresponding to the current situation is calculated, where the calculation of the total emergency level is based on the emergency level calculated for each metric. It is determined whether the total emergency level is above a critical threshold, where the critical threshold is selected by the user. If it is determined that the total emergency level is above the critical threshold, an alert is sent to a party such as one or more local authorities.

BRIEF DESCRIPTION OF THE DRAWINGS

FIG. 4 illustrates the process of determining the total emergency level of a situation based on the emergency level of FIG. 3, in accordance with an embodiment of the invention.

FIG. 5 illustrates the components of the user profile information of FIG. 1, in accordance with an embodiment of the invention.

DETAILED DESCRIPTION

In general, embodiments of the present invention provide a wearable device for automatically detecting the presence of an emergency situation and sending information related to the emergency situation to local authorities. The wearable device includes a security alert program to automatically collect and analyze data from one or more sensors included within the wearable computing device and determine if an emergency situation is present.

In various embodiments, the wearable device of the invention is used to identify emergency situations incorporating the current wearer of the device, herein referred to as "the user". Additionally, in some embodiments the device is owned and configured by a second person responsible for establishing any desired parameters and enabling and disabling the device, herein referred to as "the owner". In a preferred embodiment of the invention, the user of the device is a small child between the age of two years old and ten years old and the owner of the device is the parent or guardian of the user. It should be appreciated that the ages provided for the user are intended to serve as an example and are not intended to be limiting.

Figure 1:
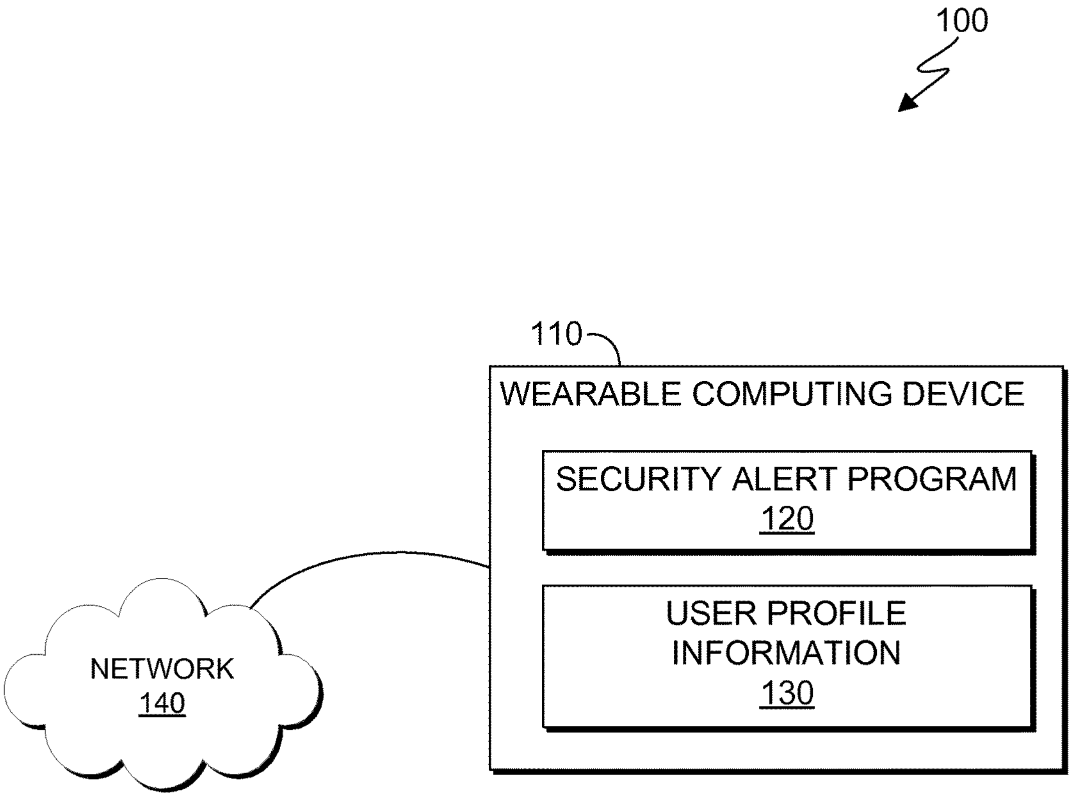
FIG. 1 is a block diagram depicting a computing environment including a wearable computing device which executes a security alert program and includes a user profile information, in accordance with an embodiment of the invention.

The present invention will now be described in detail with reference to the Figures. FIG. 1 is a functional block diagram illustrating a computing environment, generally designated 100, in accordance with one embodiment of the present invention. Computing environment 100 includes wearable computing device 110, security alert program 120, user profile information 130, and network 140.

In various embodiments of the invention, wearable computing device 110 can be a watch, a cellular phone, a smartphone, a bracelet, a necklace, a pair of glasses, a garment such as a jacket, shirt, or pants, or any other wearable item designed to incorporate the various components depicted in FIG. 5. In general, wearable computing device 110 can be any device which can be worn by a user and is capable of executing security alert program 120, storing user profile information 130, and communicating with network 140. Wearable computing device 110 may include internal and external hardware components, as depicted and described in further detail with respect to FIG. 6.

In one embodiment, wearable computing device 110 includes a number of sensors including a camera, a microphone, a touchscreen, a fingerprint scanner, a heart rate (pulse) sensor, a proximity sensor, a camera, a microphone and a body temperature sensor. In other embodiments, wearable computing device 110 can include any combination of sensors, and may include additional sensors not included in the embodiment depicted in FIG. 6. In general, wearable computing device 110 can include any sensor which allows wearable computing device 110 to monitor the physical state of the user or events which occur in close proximity to the user.

In various embodiments, wearable computing device 110 can include additional hardware components which facilitate interactions between wearable computing device 110 and other persons or electronic devices. For example, in the embodiment depicted in FIGS. 1-6, wearable computing device 110 includes a GPS device, a touchscreen input device, a fingerprint sensor, a Bluetooth communication device, an I/O port such as a universal serial bus (USB) port, and a wireless communication device incorporating a code division multiple access (CDMA) chipset or subscriber identity module (SIM) card. In general, the purpose of these components are to facilitate communication between wearable computing device 110 and local authorities in the event that an emergency situation is identified, as well as facilitating communication between the wearable computing device and another electronic device, the owner of the wearable computing device, or the user of the wearable computing device.

Security alert program 120 is a computer program which receives information from the one or more sensors included in wearable computing device 110 and determines whether it is likely that an emergency situation is present. If security alert program 120 determines that an emergency situation is present, then an alert is transmitted by wearable computing device 110 to the local authorities such as police and ambulance services as well as a selected family member such as the owner of the device and/or the parent of the user. In some embodiments, information collected by the one or more sensors such as location data, audio, video, and heart rate data is transmitted along with the alert. The functionality of security alert program 120 is described in greater detail with respect to FIG. 2.

User profile information 130 is a database of information related to the user of wearable computing device 110, in accordance with an embodiment of the invention. In one embodiment, the information included in user profile information 130 is input by the owner of the device during the initial configuration of the device which occurs before the device is utilized to identify an emergency situation. In some embodiments, it is possible for wearable computing device 110 to operate without any information being present in user profile information 130. In one embodiment, user profile information 130 includes information such as the age, height, weight, name, home address, and contact information of the user. In other embodiments, user profile information 130 includes information related to any of the biometric information which can be collected by wearable computing device 110 such as the average heart rate, the average body temperature, or a voice profile of the user. In general, user profile information 130 can include any information which is used by security alert program 120 to determine more accurately if an emergency situation is present, or information which can be used by the local authorities to locate the user of the device in an emergency situation. The information included in user profile information 130 is described in greater detail with respect to FIG. 5.

In the depicted embodiment, security alert program 120 and user profile information 130 are located on wearable computing device 110. However, in other embodiments, security alert program 120 and user profile information 130 may be located externally and accessed through a communication network such as network 140. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between wearable computing device 110, security alert program 120 and user profile information 130 in accordance with a desired embodiment of the invention.

Figure 2:
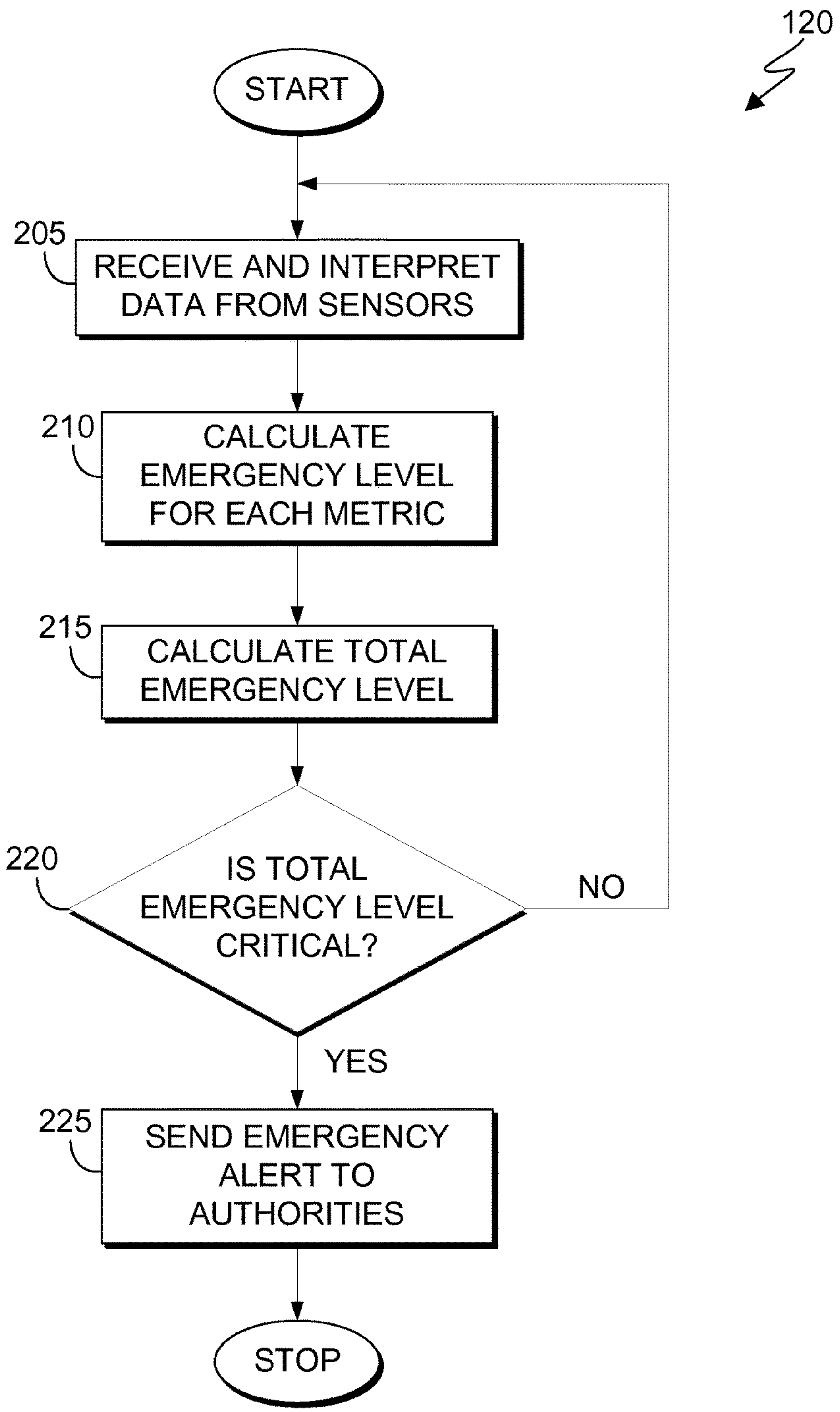
FIG. 2 is a flowchart depicting operational steps of the security alert program of FIG. 1, in accordance with an embodiment of the invention.

FIG. 2 is a flowchart depicting the operational steps included in security alert program 120 for receiving data from the one or more sensors included in wearable computing device 110 and determining whether an emergency situation is present, in accordance with an embodiment of the present invention.

In step 205, security alert program 120 receives and interprets data from one or more of the sensors included in wearable computing device 110, in accordance with an embodiment of the invention. In one embodiment, security alert program 120 receives data related to the current location of wearable computing device 110 from a GPS device included within the wearable computing device. In this embodiment, no interpretation of the received data is required, and the location, in a form such as GPS coordinates is stored as the data is received by security alert program 120. In another embodiment, security alert program 120 receives information from a heart rate sensor related to the current heart rate of the user of wearable computing device 110. In some embodiments, the information received by security alert program 120 from the heart rate sensor must be interpreted before it can be utilized by the security alert program to determine whether or not an emergency situation is present. For example, in one embodiment security alert program 120 receives information from a heart rate sensor that indicates the amount of time elapsed between successive pulses. In this embodiment, security alert program 120 interprets the received data to determine the current heart rate of the user of wearable computing device 110.

In another embodiment, security alert program 120 receives a stream of audio or video data from a device such as a camera or microphone. In general, data is received by security alert program 120 from each sensor present within wearable computing device 110 in step 205.

In step 210, security alert program 120 calculates the emergency level for each desired metric, in accordance with an embodiment of the invention. In various embodiments of the invention, a metric refers to any observable or inferred aspect of the current situation of the user which can be measured by security alert program 120. Metrics included in various embodiments can include the current location of the user, the heart rate of the user, the body temperature of the user, or an indication of whether or not the user is currently yelling for help. In general, the emergency level corresponding to each metric is determined based on the information received from at least one sensor in step 205. It should be appreciated that it is possible in various embodiments to use data received from multiple sensors in the calculation of the emergency level for a metric, and that it is possible to use the data received from multiple sensors in the calculation of the emergency level of a single metric. In various embodiments, the emergency level can be determined directly based on the information received from the sensors or can be inferred from the information received from the sensors. The process of determining the emergency level directly based on the information received from the sensors involves comparing the information received from the sensors to an acceptable range of data determined by security alert program 120. In one embodiment, the acceptable range of the data is determined based on the physical characteristics of the user such as the age, weight, height, and gender of the user. In these embodiments, information related to the age, weight, height, and gender of the user is input by either the user or the owner of wearable computing device 110. For example, in one embodiment information received from a heart rate sensor included in wearable computing device 110 is compared to an acceptable heart rate range determined based on the physical characteristics of the user. In some embodiments, additional information stored in user profile information 130 such as the average heart rate for the user of wearable computing device 110 is used to determine the acceptable range for the data received from the heart rate sensor.

In other embodiments, the emergency level corresponding to a metric is inferred from the information received from a sensor included within wearable computing device 110. In these embodiments, data such as audio or video data is analyzed to identify indications that an emergency situation is present. In some embodiments, indications of an emergency situation can include an identification of a panic voice or scream, an identification of the user yelling a word such as "help", or a code word for a panic situation identified in user profile information 130. In embodiments where the emergency level corresponding to a metric is inferred, information related to the voice profile of the user of wearable computing device 110 including the average volume and sound of the users voice, a known code word for an emergency situation, and voice profile information related to persons related to the user such as the owner of the wearable computing device, a sibling of the user, or a parent of the user.

In one embodiment, the emergency level corresponding to each metric is a binary value (a value of zero or one). The emergency level corresponding to a metric having a value of one identifies that the information received from the sensor is indicative of an emergency situation while the emergency level corresponding to a metric having a value of zero identifies that the information received from the sensor is not indicative of an emergency situation. The process of determining the emergency level corresponding to a metric is described in greater detail with respect to FIG. 3.

In step 215, security alert program 120 calculates the total emergency level of the current situation, in accordance with an embodiment of the invention. In general, the process of determining the total emergency level of the current situation involves multiplying the emergency level associated with each metric determined in step 210 by a weight associated with the each metric, then adding the result for each metric included in that embodiment of the invention. In various embodiments, the weight associated with each metric is selected by the owner of wearable computing device 110 before the wearable computing device is utilized to identify an emergency situation. In general, the purpose of the weights is to account for how effective a given metric is at identifying an emergency situation. Further, a metric which has a higher corresponding weight is determined to be a better indicator of an emergency situation than a metric which has a lower corresponding weight. The process of determining the total emergency level of the current situation is described in greater detail with respect to FIG. 4.

In decision step 220, security alert program 120 determines if the total emergency level is above or below a threshold for a critical emergency level, in accordance with an embodiment of the invention. In some embodiments, the threshold for a critical emergency level is selected by the owner of wearable computing device 110 before the wearable computing device is utilized to detect an emergency situation. In general, if the current total emergency level calculated in step 215 is above the threshold for a critical emergency level (decision step 220, yes branch), then security alert program 120 sends an emergency alert to local authorities, family members, and/or any other selected person in step 225. If the current total emergency level calculated in step 215 is below the threshold for a critical emergency level (decision step 220, no branch), then security alert program 120 continues to receive additional data from each of the sensors included in wearable computing device 110 in step 205. For example, in one embodiment the owner of wearable computing device 110 selects the threshold for a critical emergency level to be a total emergency level of 10. In this embodiment security alert program 120 calculates the total emergency level of the current situation to have a value of 8, and as a result no emergency alert is sent to local authorities and the security alert program continues receiving data from each of the sensors in step 205. In this embodiment, additional data is received from the body temperature sensor and security alert program 120 determines that the emergency level corresponding to the user's body temperature has a value of one. As a result of this change, the total emergency level of the current situation increases to a value of 11. In this embodiment, due to the value of the threshold for a critical emergency level being 10, the total emergency level is determined to be indicative of an emergency situation, and an emergency alert is sent to the local authorities in step 225.

In step 225, security alert program 120 sends an emergency situation alert to authorities, family members, and/or any other selected person, in accordance with an embodiment of the invention. In one embodiment, the recipients of the emergency alert are specified by the owner of wearable computing device 110 and stored locally on the wearable computing device in a location such as user profile information 130. In various embodiments, recipients of the emergency alert can include the owner of wearable computing device 110, the parents or guardians of the user, a neighbor, close friend, or family member of the user, or any local authorities such as local police, ambulance services, or security companies.

In general, an emergency alert sent by security alert program 120 to local authorities in step 225 includes information related to the user of wearable computing device 110 stored in user profile information 130. The information related to the user included in the emergency alert can include the name, age, gender, and contact information of the user of wearable computing device. In some embodiments, the emergency alert includes additional information such as a picture of the user or the contact information of the owner or the parents of the user. In embodiments where wearable computing device 110 includes a GPS system, the current location or last known location of the user of the wearable computing device is included in the emergency alert to assist local authorities with locating the user during an emergency situation. Additionally, in some embodiments the emergency alert includes the current received data from each of the sensors included in wearable computing device 110 along with the current total emergency level calculated by security alert program 120 in step 215.

In embodiments where wearable computing device 110 includes a camera or microphone capable of recording audio or video data, a sample of recent audio or video data recorded by the wearable computing device is included in an emergency alert generated in step 225. In these embodiments, it is desirable to protect the security and privacy of the user by encrypting the audio or video data included in the emergency alert as a safeguard against the interception of the emergency alert. In general, any known method for encrypting data such as AES encryption or RSA encryption may be used in various embodiments of the invention. In a preferred embodiment, an asymmetric encryption scheme is used where a public key is used by security alert program 120 to encrypt the audio or video data included in the emergency alert and a private key is used by each of the local authorities to decrypt the audio or video data included in the emergency alert. In general, current audio and video data is used by local authorities to identify false alarm situations and identify individuals who are responsible for creating the emergency situation such as an abduction of the user.

In a preferred embodiment, the emergency alert is transmitted from wearable computing device 110 to the local authorities using a device such as a CDMA chipset or a GSM chipset which allows for the emergency alert to be transmitted through cellular networks. In embodiments where a GSM chipset is included in wearable computing device 110, a new SIM card can be installed in the event that the user of the wearable computing device travels internationally. In other embodiments, other wireless networking technologies such as Bluetooth or WiFi can be utilized to send the emergency alert from wearable computing device 110 to the local authorities. In general, any method for wirelessly transmitting data between wearable computing device 110 and an outside network can be utilized in various embodiments of the invention.

Figure 3:
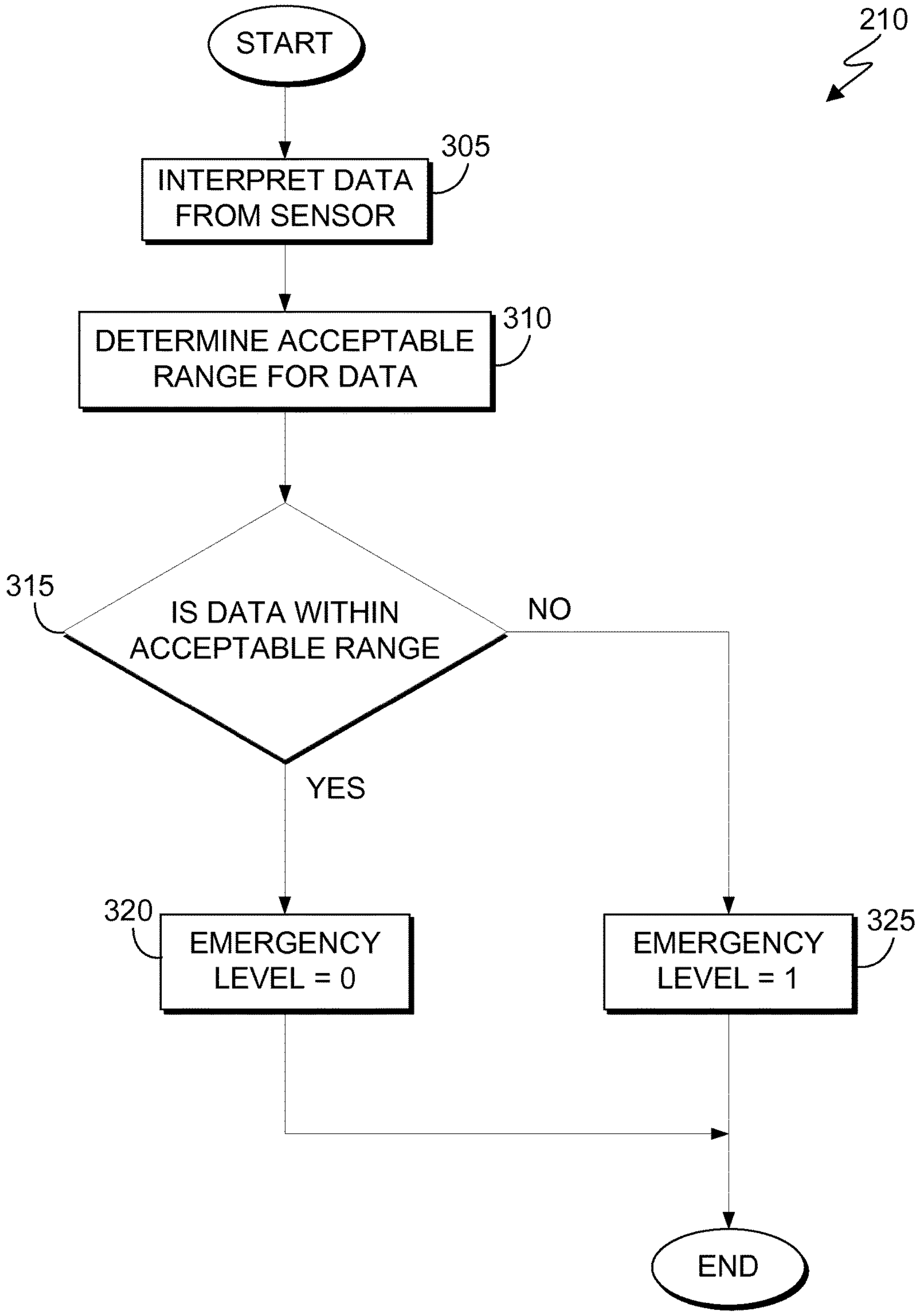
FIG. 3 is a flowchart depicting the operation steps of determining the emergency level for a given metric, in accordance with an embodiment of the invention.

FIG. 3 is a flowchart depicting the operational steps of calculating the emergency level associated with a given metric (see step 210 of security alert program 120), in accordance with an embodiment of the invention. It should be appreciated that the process depicted in FIG. 3 illustrates the process of calculating the emergency level for one metric, and that in embodiments where multiple sensors are included in wearable computing device 110 the process depicted in FIG. 3 is performed redundantly by security alert program 120 for the input received from each sensor.

In step 305, security alert program 120 interprets the data received from one or more sensors related to a specific metric, in accordance with an embodiment of the invention. In general, the process of interpreting the data received from the sensors differs based on the type and format of the data received from the sensors and the metric.

In one embodiment where security alert program 120 receives data related to the current heart rate of the user, the received data may describe the time present between successive pulses, and the data is used to determine the current heart rate of the user. In another embodiment, the received data describes the current heart rate of the user, and no additional processing steps are required.

In various embodiments, extended analysis is used to avoid false alarms of emergency situations. For example, in various embodiments it is desirable that the invention not identify an emergency situation based on an increase in the user's heart rate as a result of routine physical activity such as walking up a stairs. In these embodiments, security alert program 120 attempts to identify an increasing trend in the reported heart rate of the user over a period of time. The period of time over which the analysis occurs can be programmed or changed by a user in various embodiments. In one embodiment, security alert program 120 identifies trends where sharp increases in the heart rate of the user occur, or any pattern indicative of a physical conflict or emergency.

In general, similar processes are used in embodiments where security alert program 120 receives data related to a physical metric such as body temperature, proximity of nearby objects, or heart rate.

In embodiments where security alert program 120 interprets audio or video data, pattern match analysis is used to determine whether the received audio or video data is indicative of an emergency situation. In one embodiment, microphone data is analyzed in order to identify the origin of a recorded voice as being from a known or unknown person. In this embodiment, step 305 involves the use of pattern match algorithms or any other known software for matching patterns in speech data or similar information to the profile of a known person. In various embodiments, profile information for known persons such as the parents of the user is stored locally on the device.

In step 310, security alert program 120 determines the acceptable range for the data received from the sensor, in accordance with an embodiment of the invention. In various embodiments, the acceptable range for the data received from each sensor is determined based on the information related to the physical characteristics of the user stored in user profile information 130 such as the age, height, weight, and gender of the user. For example, in one embodiment, where the user of wearable computing device 110 is 4 years old, the acceptable range for the user's heart rate is determined to be between 60 and 180 beats per minute. In another embodiment, where the user is 11 years old, the acceptable range for the user's heart rate is determined to be between 60 and 170 beats per minute. In some embodiments, the acceptable range for the data received from the sensor is determined by medical professionals and downloaded onto wearable computing device 110 via network 140.

In decision step 315, security alert program 120 determines if the data received from the sensor is within an acceptable range set by medical professionals based on the age, gender, and physical characteristics of the user, in accordance with an embodiment of the invention. In one embodiment, if the data received from the sensor is within the acceptable range set by medical professionals, then security alert program 120 sets the emergency level corresponding to the metric to a value of zero in step 320. If the data received from the sensor is not within the acceptable range set by medical professionals, then security alert program 120 sets the emergency level corresponding to the metric to a value of one in step 325. For example, in an embodiment where data received from a heart rate sensor indicates that the users heart rate is currently 140 beats per minute and the acceptable range for the heart rate of the user is between 60 and 170 beats per minute, security alert program 120 determines that the data received from the sensor is within the acceptable range set by medical professionals. In other embodiments, the emergency level corresponding to a given metric can be set to be a value between zero and one based on where within the acceptable range the data corresponding to that metric is. Additionally, in these embodiments, the emergency level corresponding to a given metric can be set to a value greater than one based on how far outside of the acceptable range the data corresponding to that metric is.

In step 320, security alert program 120 sets the emergency level corresponding to the metric to a value of zero, in accordance with an embodiment of the invention. In general, an emergency level of zero indicates that the information received from a given sensor is not indicative of an emergency situation, while an emergency level of one indicates that the information received from a given sensor is indicative of an emergency situation. Because security alert program 120 has determined that the data received from the sensor is within the acceptable range in decision step 315, the emergency level is set to a value of zero to indicate that it is unlikely that an emergency situation is present.

In step 325, security alert program 120 sets the emergency level corresponding to the metric to a value of one, in accordance with an embodiment of the invention. In general, an emergency level of one indicates that the information received from a given sensor is indicative of an emergency situation. Because security alert program 120 has determined that the data received from the sensor is not within the acceptable range in decision step 315, the emergency level is set to a value of one to indicate that it is likely that an emergency situation is present.

FIG. 4 is a table illustrating an exemplary process of determining the total emergency level of a current situation (see step 215 of security alert program 120), in accordance with an embodiment of the invention. It should be appreciated that the table depicted in FIG. 4 is intended to be illustrative of the process of determining the total emergency level of the current situation, and that other methods of implementing the process described in FIG. 4 which do not require the use of a table can be used.

Each row (rows 410, 420, 430, 440, and 450) depicted in FIG. 4 corresponds to a metric related to the data received from one of the sensors (see FIG. 6, heartrate sensor 620, GPS device 622, camera/microphone 624, proximity sensor 626, and temperature sensor 628) included in wearable computing device 110. In the depicted embodiment, the metrics analyzed include the heart rate, body temperature, proximity of nearby objects, panic voice indication, and voice identification. In this embodiment, panic voice indication is a metric related to whether or not the user's voice is indicative of an emergency situation, such as yelling for help or screaming. Additionally, voice identification is a metric related to whether the user of wearable computing device 110 is in close proximity to one or more persons unknown to the wearable computing device.

Within each row, the cell present within column 460 identifies the name of each metric. Additionally, the cell present within column 470 includes a binary value indicating whether or not the emergency level corresponding to the metric was determined to have a value of zero or one, as determined in step 210 of security alert program 120. A metric having an emergency level of one indicates that the metric is indicative of an emergency situation while a metric having an emergency level of zero indicates that the metric is not indicative of an emergency situation.

Within each row, the cell present within column 480 includes the weight associated with each metric. In the depicted embodiment, the weight associated with each metric is a value between one and five which corresponds to how useful or important each metric is in identifying an emergency situation. It should be appreciated by one skilled in the art that the weights depicted for each metric in FIG. 4 are intended for illustrative purposes and are not meant to be limiting.

Within each row, the cell present within column 490 represents the total weighted emergency level for each metric. In general, the weighted total emergency level is calculated for each metric by multiplying the emergency level for the metric by the weight for the metric. As a result of this, any time that the emergency level is zero for a given metric, the corresponding weighted emergency level for the metric is also zero. Similarly, any time that the emergency level is one for a given metric, the corresponding weighted emergency level for the metric is equal to the weight for that metric.

Cell 495 represents the total emergency value corresponding to the current situation. In various embodiments, the total emergency value corresponding to the current situation is calculated by adding the total weighted emergency level for each metric together. In general, whether or not an emergency situation is present is determined based on a threshold for the total emergency value, and whether or not an emergency alert is created cannot be determined based on the total emergency value alone.

FIG. 5 illustrates one example of the information included within user profile information 130, in accordance with an embodiment of the invention. In the depicted embodiment, user profile information includes columns 510 and 520 and a number of rows such as rows 530 and 540. In various embodiments, each row included within user profile information 130 corresponds to a field of information included within the user profile information such as the age of the user. The number of rows included in each embodiment of the invention is determined by the desired number of fields to be included within user profile information 130. Within each row, the cell present within column 510 identifies the name of the field, and the cell present within column 520 contains the value for that field. For example, within row 540, the cell present within column 510 identifies the field as the last name of the user and the cell present within column 520 identifies that the last name of the user is "Smith".

In various embodiments, user profile information 130 can include any number of rows, and may include additional fields not included in the depicted embodiment of FIG. 5. In these embodiments, user profile information 130 may include information related to the owner of wearable computing device 110 or a person who is to be contacted in the event of an emergency situation. In other embodiments, user profile information 130 includes fields such as the voice profile of the user or any other known persons such as the owner or the parent or guardian of the user. In these embodiments, large amounts of digital information are needed for each field, and as a result a link to another file stored on wearable computing device 110 may be included in the cell within column 520 of a given row. It should be appreciated that the fields which can be included in user profile information 130 are not limited to the fields illustrated in the depicted embodiment of FIG. 5, and that any other field including information which would be useful to the local authorities can be included in various embodiments of the invention.

Figure 6:
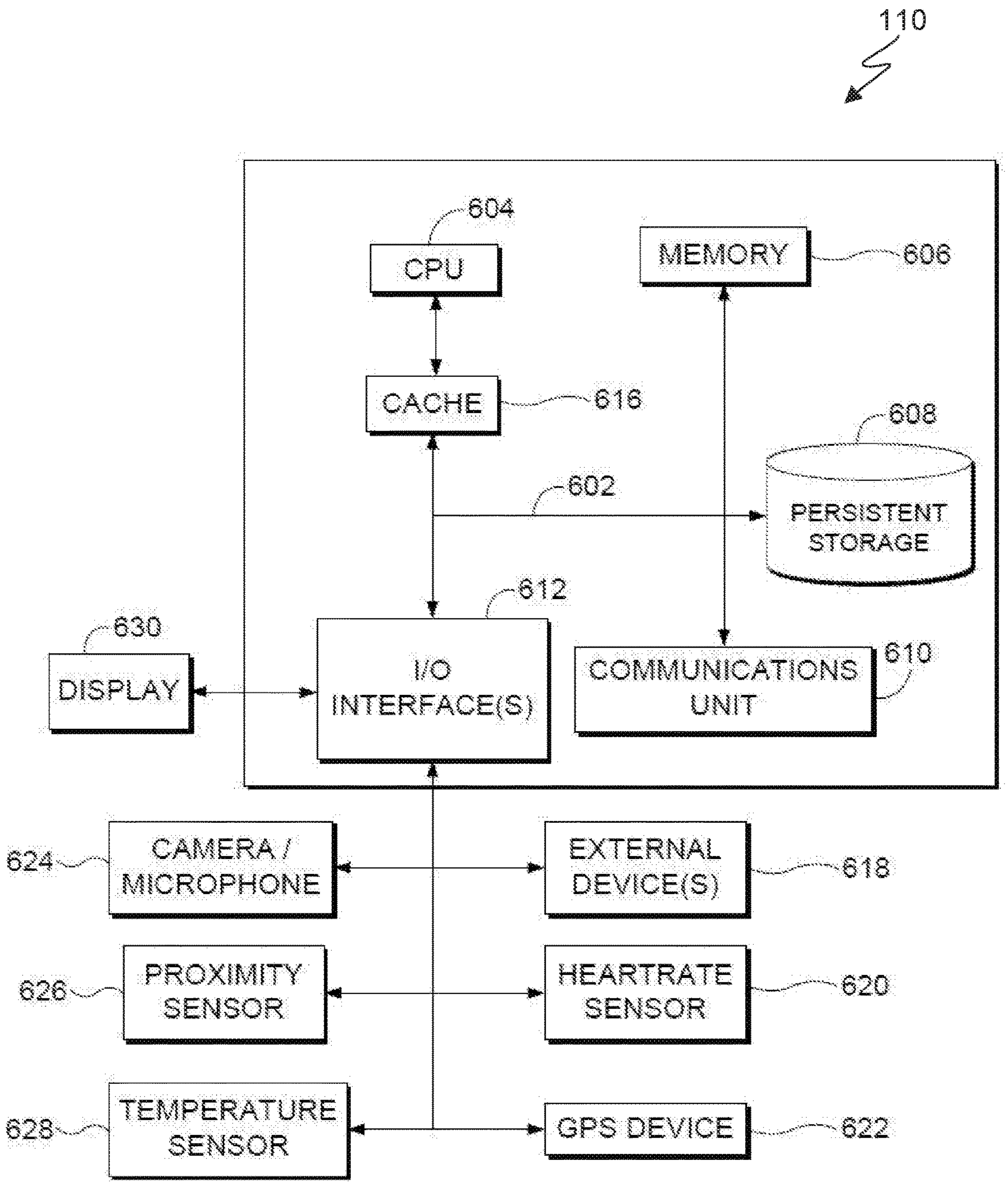
FIG. 6 is a block diagram illustrating the hardware components included in a computing device of FIG. 1 executing the workload distribution program, in accordance with an embodiment of the invention.

FIG. 6 depicts the components of computing device 110, which is an example of a computing device that includes workload distribution program 140 of embodiments of the present invention. Computing device 110 includes communications fabric 602, which provides communications between CPU 604, memory 606, persistent storage 608, communications unit 610, input/output (I/O) interface(s) 612, cache 616, data processing element 120, and data processing element 130. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data and data near accessed data from memory 606.

Program instructions and data used to practice embodiments of the present invention may be stored in persistent storage 608 for execution by one or more of the respective CPU(s) 604 via cache 616 and one or more memories of memory 606. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to a display 630.

Display 630 provides a mechanism to display data to a user and may be, for example, a computer monitor.

Heartrate sensor 620 is a device which measures and records the heart rate of the user of wearable computing device 110. In various embodiments, any known method of measuring the current heart rate of a user can be utilized.

Global positioning system (GPS) device 622 is a device which identifies the current location of wearable computing device 110 and reports latitude, longitude, and elevation coordinates which describe the current location of wearable computing device 110 at any time.

Camera/microphone 624 is a camera or microphone device which is capable of recording sound and/or video information. In some embodiments camera/microphone 624 sends digital information related to the sound and/or video information captured by camera/microphone 624 to wearable computing device 110. In other embodiments, camera/microphone 624 stores digital information related to the sound and/or video information captured by camera/microphone 624 on a digital storage device included within camera/microphone 624.

Proximity sensor 626 is a device which determines and records the proximity of large objects to the user of wearable computing device 110. In various embodiments, any known type of proximity sensor can be used, such as an optical, laser, radar, or acoustic proximity sensor.

Temperature sensor 628 is a device which measures the current temperature of the environment in which wearable computing device 110 is currently located. In various embodiments, any known method of implementing a temperature sensor can be used.

It should be appreciated that any sensors capable of measuring a physical property of the user or the environment in which the user is located can be included in other embodiments of the invention. Additionally, the exemplary combination of sensors depicted in FIG. 6 is meant to be illustrative and is not intended to be limiting.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for identifying a situation and sending an alert, the method comprising the steps of:

receiving, by one or more processors, data from at least one sensor of a plurality of sensors included within a wearable computing device, wherein the plurality of sensors includes at least one of a microphone and a video camera;

calculating, by one or more processors, one or more emergency levels based, at least in part, on the data received from the at least one sensor and a comparison to data in a user profile, wherein:

the user profile includes of information related to the average volume and sound of the voice of the user and information related to the average volume and sound of the voice of a person known by the user; and each emergency level of the one or more emergency levels corresponds to at least one metric of a plurality of metrics;

calculating, by one or more processors, a total emergency level based, at least in part, on the one or more emergency levels;

determining, by one or more processors, that the total emergency level is above a preselected critical threshold; and responsive to determining that the total emergency level is above a preselected critical threshold, causing, by one or more processors, an alert to be sent to a party, wherein the alert includes at least one of audio information captured by the microphone and video information captured by the video camera.

2. The method of claim 1, wherein the wearable computing device is worn by a user and is in contact with at least a portion of the user's skin.

3. The method of claim 1, wherein the plurality of sensors further includes a proximity sensor.

4. The method of claim 2, wherein the plurality of metrics are selected from the group consisting of: number and size of objects in proximity to the user; an indication of a panicked voice; an identification of a user yelling "help"; and an identification of a person known by the user.

5. The method of claim 4, wherein the alert further includes proximity sensor information comprising the number and size of objects in proximity to the user.

6. The method of claim 1, wherein the calculation of the total emergency level is based, at least in part, on the one or more emergency levels and a weight associated with each emergency level.

7. The method of claim 1, wherein the party comprises one or more of: a parent of a user; a relative of a user; a guardian of a user; a close friend of a user; a medical professional associated with the user; a police department; a fire department; and emergency medical personnel.

8. A computer program product for identifying a situation and sending an alert, the computer program product comprising:

one or more computer readable storage media and program instructions stored on the one or more computer readable storage media, the program instructions comprising:

program instructions to receive data from at least one sensor of a plurality of sensors included within a wearable computing device, wherein the plurality of sensors includes at least one of a microphone and a video camera;

program instructions to calculate one or more emergency levels based, at least in part, on the data received from the at least one sensors and a comparison to data in a user profile, wherein:

the user profile includes of information related the average volume and sound of the voice of the user and information related to the average volume and sound of the voice of a person known by the user; and each emergency level of the one or more emergency levels corresponds to at least one metric of a plurality of metrics;

program instructions to calculate at total emergency level based, at least in part, on the one or more emergency levels;

program instructions to determine that the total emergency level is above a preselected critical threshold; and program instructions to cause, responsive to determining that the total emergency level is above the preselected critical threshold, an alert to be sent to a party, wherein the alert includes at least one of audio information captured by the microphone and video information captured by the video camera.

9. The computer program product of claim 8, wherein the wearable computing device is worn by a user and is in contact with at least a portion of the user's skin.

10. The computer program product of claim 8, wherein the plurality of sensors further includes a proximity sensor.

11. The computer program product of claim 9, wherein the plurality of metrics are selected from the group consisting of: number and size of objects in proximity to the user; an indication of a panicked voice; an identification of a user yelling "help"; and an identification of a person known by the user.

12. The computer program product of claim 11, wherein the alert further includes proximity sensor information comprising the number and size of objects in proximity to the user.

13. The computer program product of claim 8, wherein the calculation of the total emergency level is based, at least in part, on the one or more emergency levels and a weight associated with each emergency level.

14. The computer program product of claim 8, wherein the party comprises one or more of: a parent of a user; a relative of a user; a guardian of a user; a close friend of a user; a medical professional associated with the user; a police department; a fire department; and emergency medical personnel.

15. A computer system for identifying a situation and sending an alert, the computer system comprising:

one or more computer processors, one or more computer readable storage media, and program instructions stored on the one or more computer readable storage media for execution by at least one of the more or more processors, the program instructions comprising:

program instructions to receive data from at least one sensor of a plurality of sensors included within a wearable computing device, wherein the plurality of sensors includes at least one of a microphone and a video camera;

program instructions to calculate one or more emergency levels based, at least in part, on the data received from the at least one sensors and a comparison to data in a user profile, wherein:

the user profile includes information related to the average volume and sound of the voice of the user and information related to the average volume and sound of the voice of a person known by the user; and each emergency level of the one or more emergency levels corresponds to at least one metric of a plurality of metrics;

program instructions to calculate at total emergency level based, at least in part, on the one or more emergency levels;

program instructions to determine that the total emergency level is above a preselected critical threshold; and program instructions to cause, responsive to determining that the total emergency level is above the preselected critical threshold, an alert to be sent to a party, wherein the alert includes at least one of audio information captured by a microphone included on the wearable computing device and video information captured by a video camera included on the wearable computing device.

16. The computer system of claim 15, wherein the wearable computing device is worn by a user and is in contact with at least a portion of the user's skin.

17. The computer system of claim 15, wherein the plurality of sensors further includes a proximity sensor.

18. The computer system of claim 16, wherein the plurality of metrics are selected from the group consisting of: number and size of objects in proximity to the user; sample an indication of a panicked voice; an identification of a user yelling "help"; and an identification of a person known by the user.

19. The computer system of claim 18, wherein the alert further includes proximity sensor information comprising the number and size of objects in proximity to the user.

* * * * *